United States Patent
Boivin

(10) Patent No.: US 11,643,156 B2
(45) Date of Patent: May 9, 2023

(54) TRACK ASSEMBLY FOR A MOTORIZED VEHICLE FIELD

(71) Applicant: Denis Boivin, Beaumont (CA)

(72) Inventor: Denis Boivin, Beaumont (CA)

(73) Assignee: Denis Boivin, Beaumont (CA)

( * ) Notice: Subject to any disclaimer, the term of this patent is extended or adjusted under 35 U.S.C. 154(b) by 1190 days.

(21) Appl. No.: 16/210,122

(22) Filed: Dec. 5, 2018

(65) Prior Publication Data

US 2019/0176914 A1    Jun. 13, 2019

(30) Foreign Application Priority Data

Dec. 11, 2017  (CA) ................................ CA 2988376

(51) Int. Cl.
| | |
|---|---|
| *B62D 55/12* | (2006.01) |
| *B62D 55/065* | (2006.01) |
| *B62D 55/04* | (2006.01) |
| B62D 21/18 | (2006.01) |
| B62D 11/00 | (2006.01) |

(52) U.S. Cl.
CPC ............ *B62D 55/12* (2013.01); *B62D 55/04* (2013.01); *B62D 55/065* (2013.01); *B62D 11/00* (2013.01); *B62D 21/18* (2013.01)

(58) Field of Classification Search
CPC ...... B62D 55/12; B62D 55/04; B62D 55/065; B62D 11/00; B62D 21/18
USPC ........................................................ 305/136
See application file for complete search history.

(56) References Cited

U.S. PATENT DOCUMENTS

| | | | | |
|---|---|---|---|---|
| 3,737,001 A | * | 6/1973 | Rasenberger | B62D 55/04 180/185 |
| 3,863,726 A | * | 2/1975 | O'Brien | B62D 55/04 180/9.5 |
| 4,415,055 A | | 11/1983 | Ahn | |
| 4,821,824 A | | 4/1989 | Gilbert | |

FOREIGN PATENT DOCUMENTS

| | | |
|---|---|---|
| EP | 0 784 007 A1 | 7/1997 |
| WO | 2016/181545 A1 | 11/2016 |

* cited by examiner

*Primary Examiner* — Tony H Winner
*Assistant Examiner* — Felicia L. Brittman
(74) *Attorney, Agent, or Firm* — Alexandre Daoust; Norton Rose Fulbright Canada LLP

(57) ABSTRACT

There is disclosed a track assembly having a frame; an endless track engaged with a track wheel system, the track wheel system having a track driving wheel and at least another wheel. An axle engaging device is rotatably mounted to the frame and is securable to a driven axle of a vehicle. An axis of rotation of the axle engaging device is spaced apart from a ground contacting area of the endless track by a distance taken along an axis perpendicular to the ground contacting area. A mechanism drivingly engages the axle engaging device to the track driving wheel. The mechanism defines a speed ratio defined as a rotational speed of the track driving wheel over a rotational speed of the axle engaging device. The distance is greater than a product of the speed ratio by a radius of the track driving wheel.

20 Claims, 9 Drawing Sheets

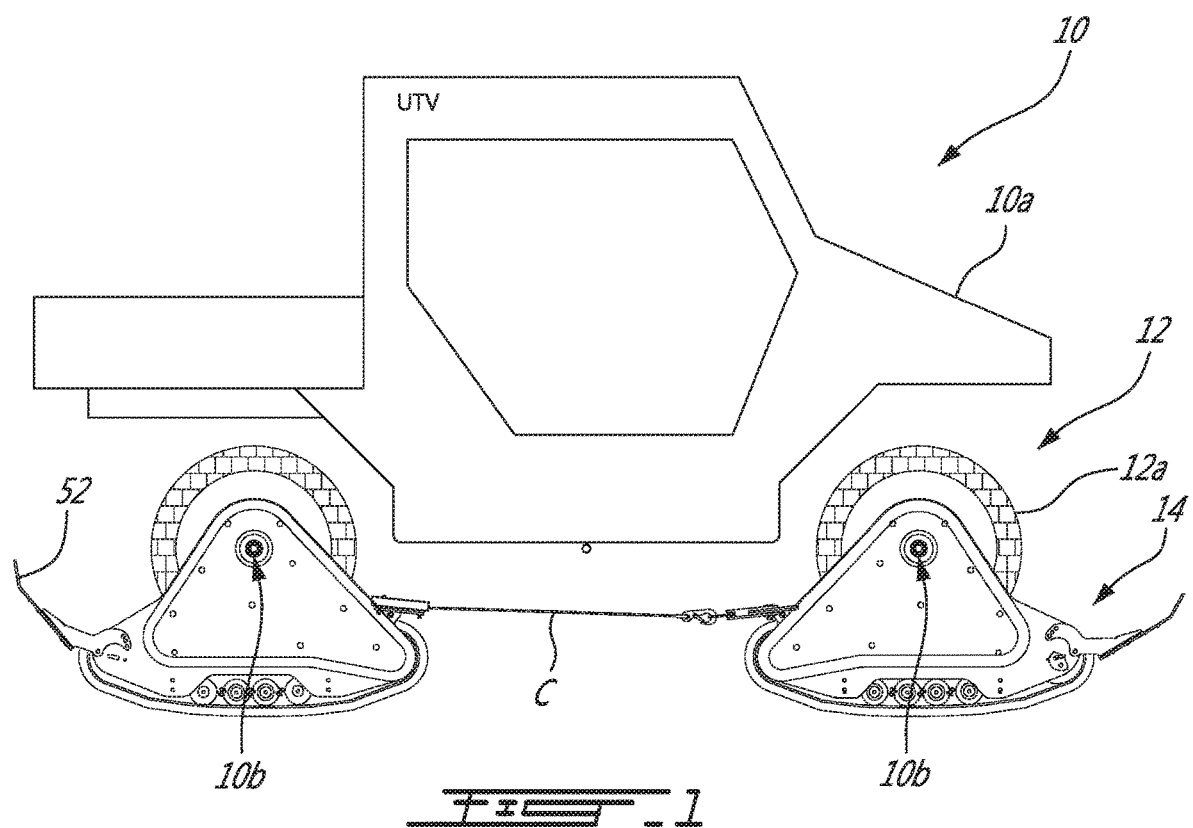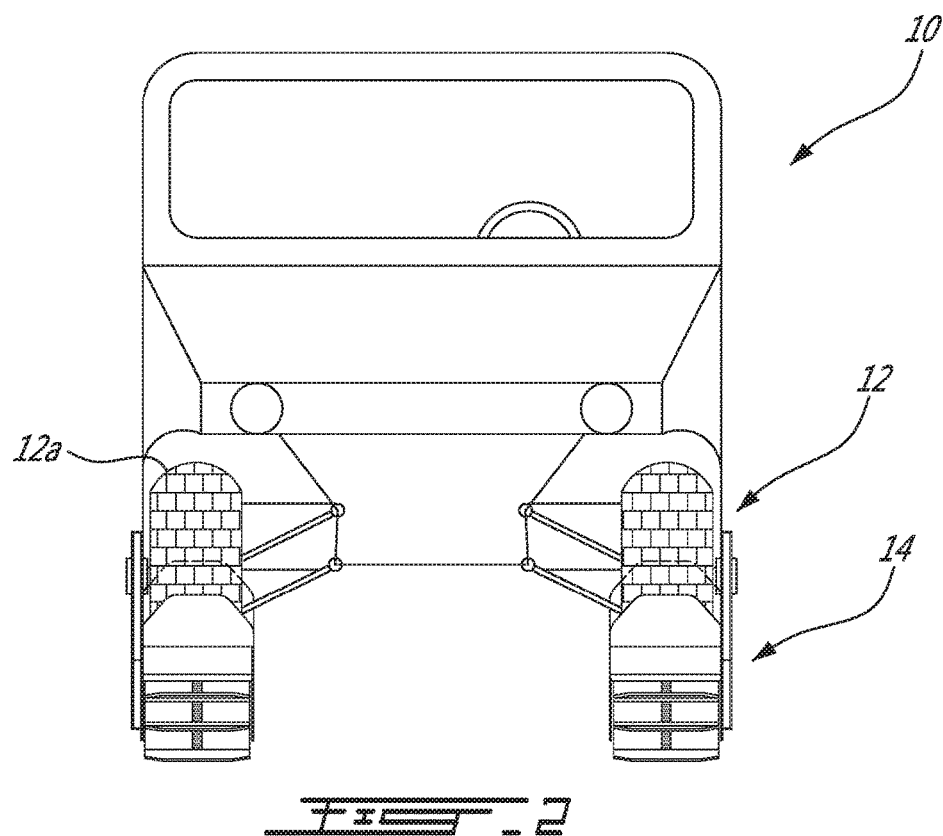

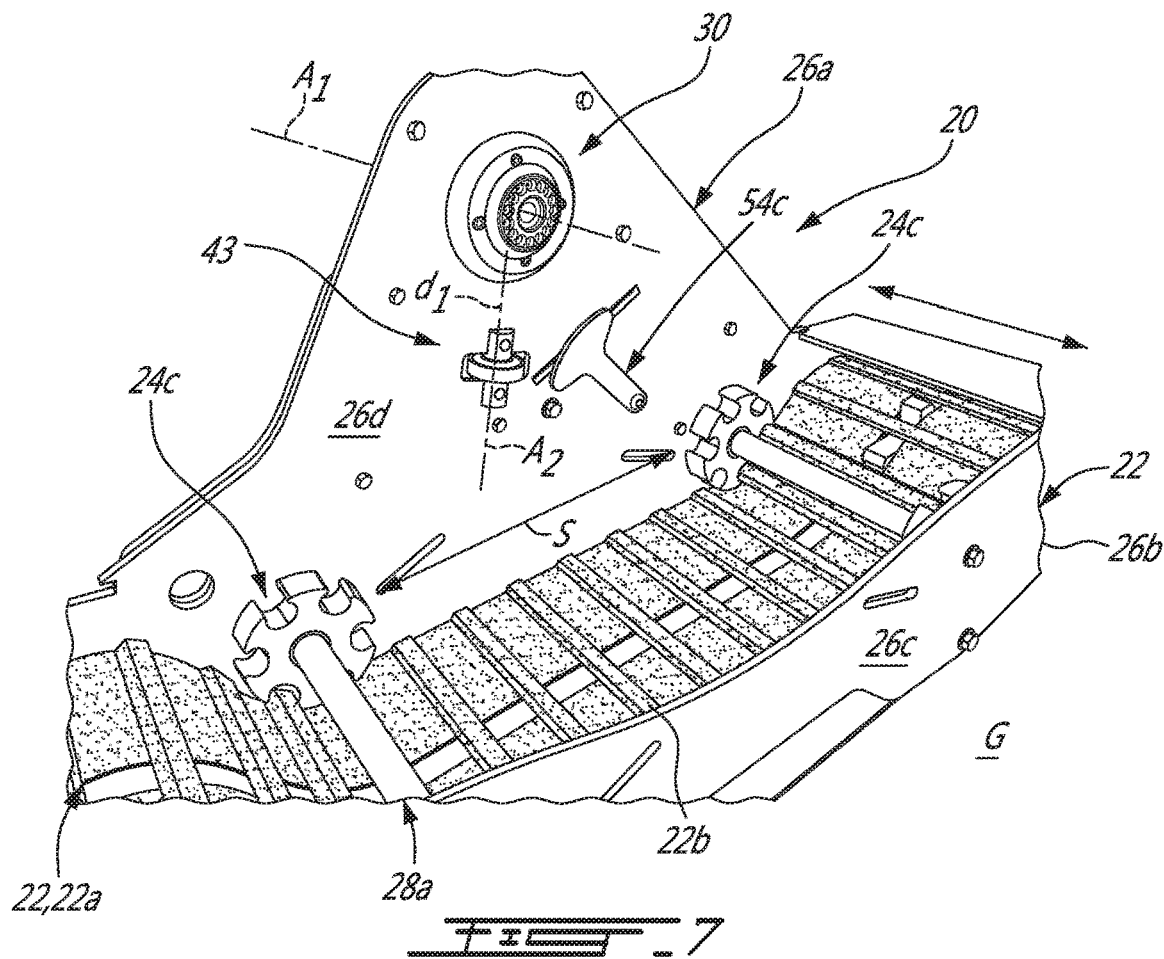
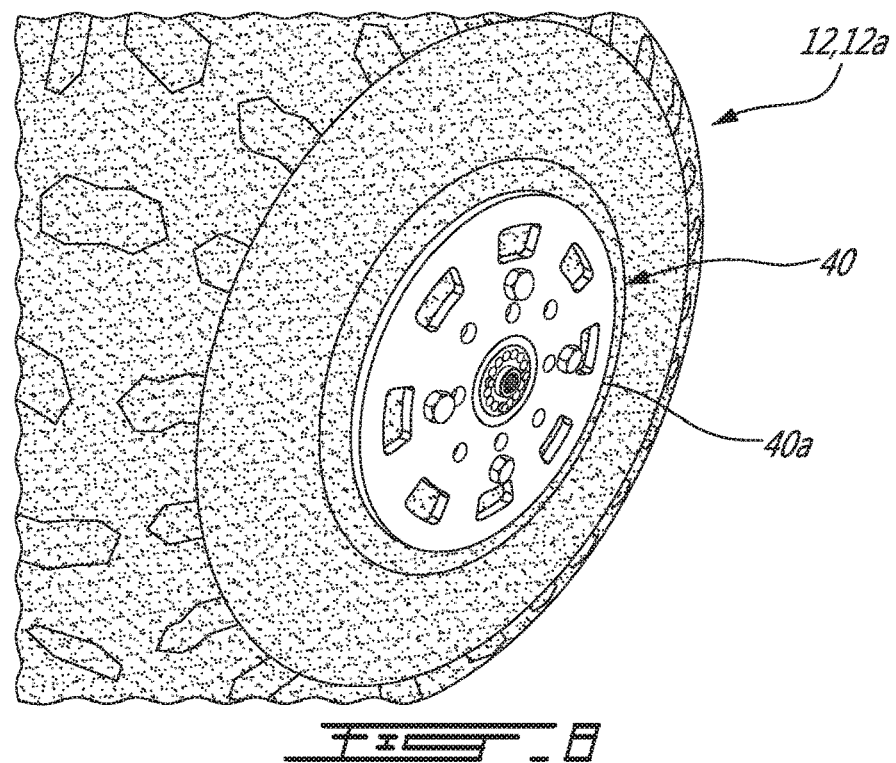

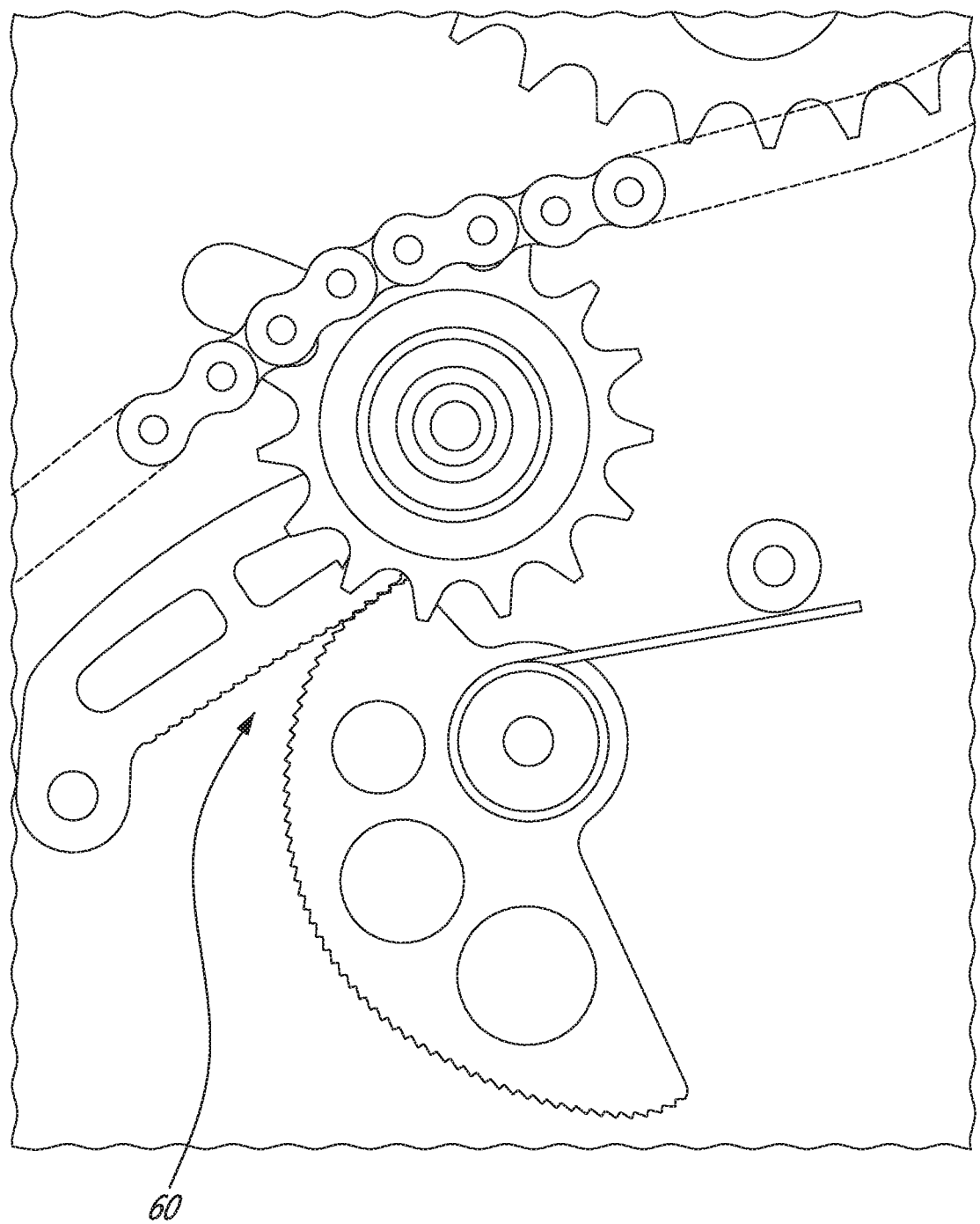

TRACK ASSEMBLY FOR A MOTORIZED VEHICLE FIELD

The improvements generally relate to the field of motorized vehicles and, more particularly, to track assemblies engageable with motorized vehicles.

BACKGROUND

It is well known that many people drive their vehicles, including trucks, cars and other types of vehicles, through all types of terrain and road (or off-road) conditions. In difficult driving conditions (collectively referred to as 'adverse conditions') such as snow, sand, gravel, mud, ice, and the like, wheeled vehicles can experiment considerable propelling difficulties.

Traction (or track) assemblies, or track units, have been developed for converting a wheeled driven vehicle, such as trucks, cars, SUV, all-terrain vehicles, and the like, into a track-like driven vehicle for improved traction in certain types of terrain and driving conditions.

Typically for mounting a track assembly to a wheeled vehicle, the wheels and tires must be removed on each axle of the vehicle and are replaced by track assemblies. The frame of the track assemblies are secured to the frame of the vehicle. The installation or removal of the track assemblies must be carried out in a specialized facility. Moreover, such track assemblies can require to be secured to the frame of the vehicle to preclude their rotation about the vehicle axle. Securing the frame of the track assembly to the frame of the vehicle can require a bracket which is designed specifically for the model of the vehicle. Maintaining an inventory of brackets for various vehicles can be inconvenient and represent a source of additional costs. Moreover, the track assembly attached to the vehicle with brackets, typically via its suspension table, are known to damage the vehicle suspension table.

There is thus a need for a track assembly for a wheeled vehicle which does not require removal of the wheels, which is relatively easy and quick to install, and effective for improving traction for standard motorized vehicles in adverse conditions.

SUMMARY

In accordance with one aspect, there is provided a track assembly for a motorized vehicle having at least one driven axle, the track assembly comprising a frame; an endless track engaged with a track wheel system, the track wheel system having a track driving wheel and at least another wheel being rotatably mounted to the frame about respective axles, the endless track in driving engagement with the track driving wheel; an axle engaging device rotatably mounted to the frame about a corresponding axle, the axle engaging device being securable to the at least one driven axle and being drivable into rotation by the at least one driven axle, an axis of rotation of the axle engaging device spaced apart from a ground contacting area of the endless track by a distance taken along an axis perpendicular to the ground contacting area; and a mechanism drivingly engaging the axle engaging device to the track driving wheel, the mechanism transmitting a rotation of the axle engaging device to the track driving wheel, the mechanism defining a speed ratio defined as a rotational speed of the track driving wheel over a rotational speed of the axle engaging device, the distance greater than a product of the speed ratio by a radius of the track driving wheel.

In accordance with another aspect, there is provided a motorized vehicle comprising two axles, at least one of the two axles being driven, the motorized vehicle further including at least two track assemblies mounted on the at least one of the two axles, each of the at least two track assemblies having a frame; an endless track engaged with a track wheel system, the track wheel system including a track driving wheel and another wheel rotatably mounted on the frame about respective axles, the endless track in driving engagement with the track driving wheel; an axle engaging device rotatably mounted on the frame about a corresponding axle, the axle engaging device drivingly engaged by the at least one of the two axles, an axis of rotation of the axle engaging device spaced apart from a ground contacting area of the endless track by a distance taken along an axis perpendicular to the ground contacting area, each of the track assemblies secured to the motorized vehicle solely via the axle engaging device; and a mechanism drivingly engaging the axle engaging device with the track driving wheel, the mechanism transmitting a rotation of the axle engaging device to the track driving wheel, the mechanism defining a speed ratio defined as a rotational speed of the track driving wheel over a rotational speed of the axle engaging device, the distance greater than a product of the speed ratio by a radius of the track driving wheel.

In accordance with yet another aspect, there is provided a track kit for a motorized vehicle having wheels, the track kit comprising: a mounting plate configured for being secured to one of the wheels of the motorized vehicle, the mounting plate defining a central aperture for receiving a fastener; and a track assembly having a frame; an endless track engaged with a track wheel system, the track wheel system having a track driving wheel and at least one idler wheel being rotatably mounted to the frame about respective axles, the endless track in driving engagement with the track driving wheel; an axle engaging device rotatably mounted to the frame about a corresponding axle, the axle engaging device being securable to the mounting plate for integral rotation therewith, an axis of rotation of the axle engaging device spaced apart from a ground contacting area of the endless track by a distance taken along an axis perpendicular to the ground contacting area; and a mechanism drivingly engaging the axle engaging device to the track driving wheel, the mechanism transmitting a rotation of the axle engaging device to the track driving wheel, the mechanism defining a speed ratio defined as a rotational speed of the track driving wheel over a rotational speed of the axle engaging device, the distance greater than a product of the speed ratio by a radius of the track driving wheel.

In accordance with still another aspect, there is provided a track assembly for a motorized vehicle having at least one driven axle, a frame, an endless track engaged with a track wheel system, the track wheel system having a track driving wheel and at least another wheel being rotatably mounted to the frame about corresponding transversal track wheel axes, an axle engaging device rotatably mounted to the frame about a corresponding transversal axle axis, the axle engaging device being securable to the at least one driven axle and being drivable into rotation by the axle engaging device, and a mechanism drivingly engaging the axle engaging device to the track driving wheel.

In accordance with another aspect, there is provided a track assembly for a motorized vehicle having at least one driven axle, a frame, an endless track engaged with a track wheel system, the track wheel system having a track driving wheel and at least another wheel being rotatably mounted to the frame about corresponding transversal track wheel axes, an axle engaging device rotatably mounted to the frame about a corresponding transversal axle axis, the axle engaging device being securable to the at least one driven axle and being drivable into rotation by the axle engaging device, and a mechanism drivingly engaging the axle engaging device to the track driving wheel and being configured in a manner that when the endless track is engaged with the ground, and the axle engaging device is rotated by a given angle, the mechanism imparts a displacement of the track around the track wheel system over a track advancement dimension which is less than a dimension of a projection of the given angle from the axle axis to the ground.

In accordance with yet still another aspect, there is provided a track assembly for a motorized vehicle having at least one driven axle, a frame, an endless track engaged with a track wheel system, the track wheel system having a track driving wheel rotatably mounted to the frame about a transversal track wheel axis, an axle engaging device rotatably mounted to the frame about a transversal axle axis, the axle engaging device being drivable into rotation by the axle engaging device, and a mechanism drivingly engaging the axle engaging device to the track driving wheel, wherein the track assembly has a ratio of $\Delta/D_{frame}$ of above 0.45. The axle engaging device can be bolted to the axle, for instance.

Many further features and combinations thereof concerning the present improvements will appear to those skilled in the art following a reading of the instant disclosure.

DESCRIPTION OF THE FIGURES

In the figures,

FIG. 1 is a schematic side elevation view of a vehicle having track kits in accordance with one embodiment;

FIG. 2 is a schematic front elevation view of the vehicle of FIG. 1;

FIG. 7 is a schematic oblique view of a track assembly of one of the track kits of FIG. 1 in accordance with one embodiment;

FIG. 8 is a schematic oblique view of a tire of the vehicle of FIG. 1 having mounted thereon a mounting plate of one of the track kits of FIG. 1;

FIG. 15 is a schematic three-dimensional view of a portion of a chain tensioner of the track assembly of FIG. 7 in accordance with another embodiment.

DETAILED DESCRIPTION

Figure 3:
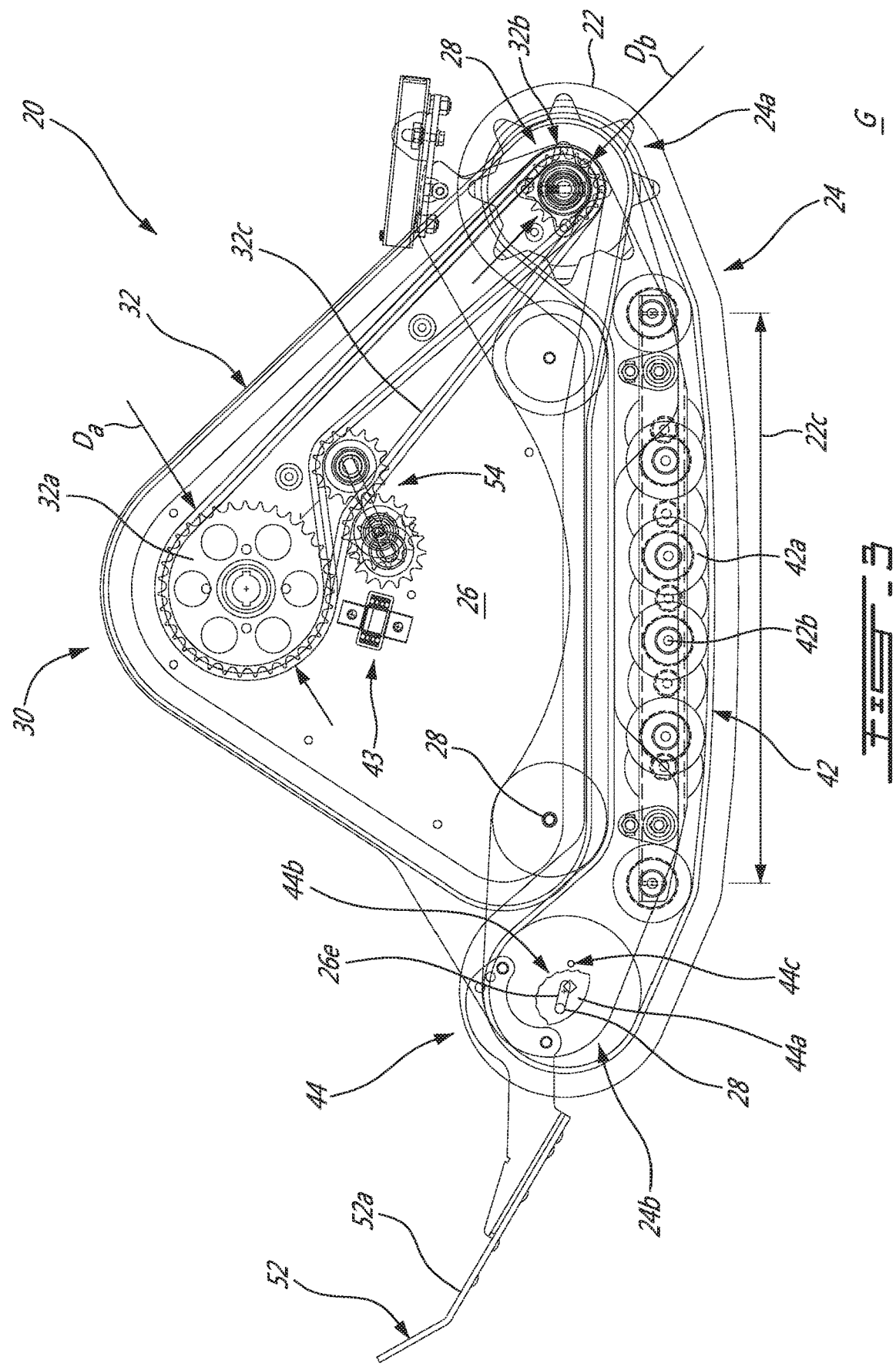
FIG. 3 is a schematic partially transparent side elevation view of the track assembly of FIG. 1.

Referring to FIGS. 1-2, a vehicle 10 having a structure 10a and four wheels 12 rotatably mounted thereon is shown.

As illustrated, the vehicle 10 is an all-terrain motorized vehicle in which the four wheels 12 are motorized. However, in some conditions, wheels, which include tires 12a, are not sufficient in providing the desired traction. This may occur, for instance, on muddy or icy grounds. As shown, the vehicle 10 is provided with track kits 14 configured to be mounted to the vehicle 10 via the wheels 12. The track kits 14 might offer an improved traction on such grounds compared to the wheels 12. In a particular embodiment, the vehicle may be, for instance, a mini-truck or a small sport utility vehicle (SUV).

In some embodiments, it may be required to connect two of the track kits 14 that are located on a same side of the vehicle 10 (i.e., driver or passenger side) with each other via a cable C. In a particular embodiment, the cable C is a safety feature to ensure that the track kits 14 that are on the same side do not rotate around vehicle axles 10b and hence hit portions of the vehicle 10. However, as will be discussed herein below, the disclosed track kit 14 might not require such cables to preclude rotation. In some cases, the cable C is required to allow the vehicle 10 to climb over big obstacles (e.g., sidewalks, tree trunk). More specifically, the cable C limits rotation of track kits 14 located at the rear of the vehicle 10 when the obstacle is between axles 10b of the vehicle 10 and when the rear track kits 14 climb over the obstacle.

Figure 4:
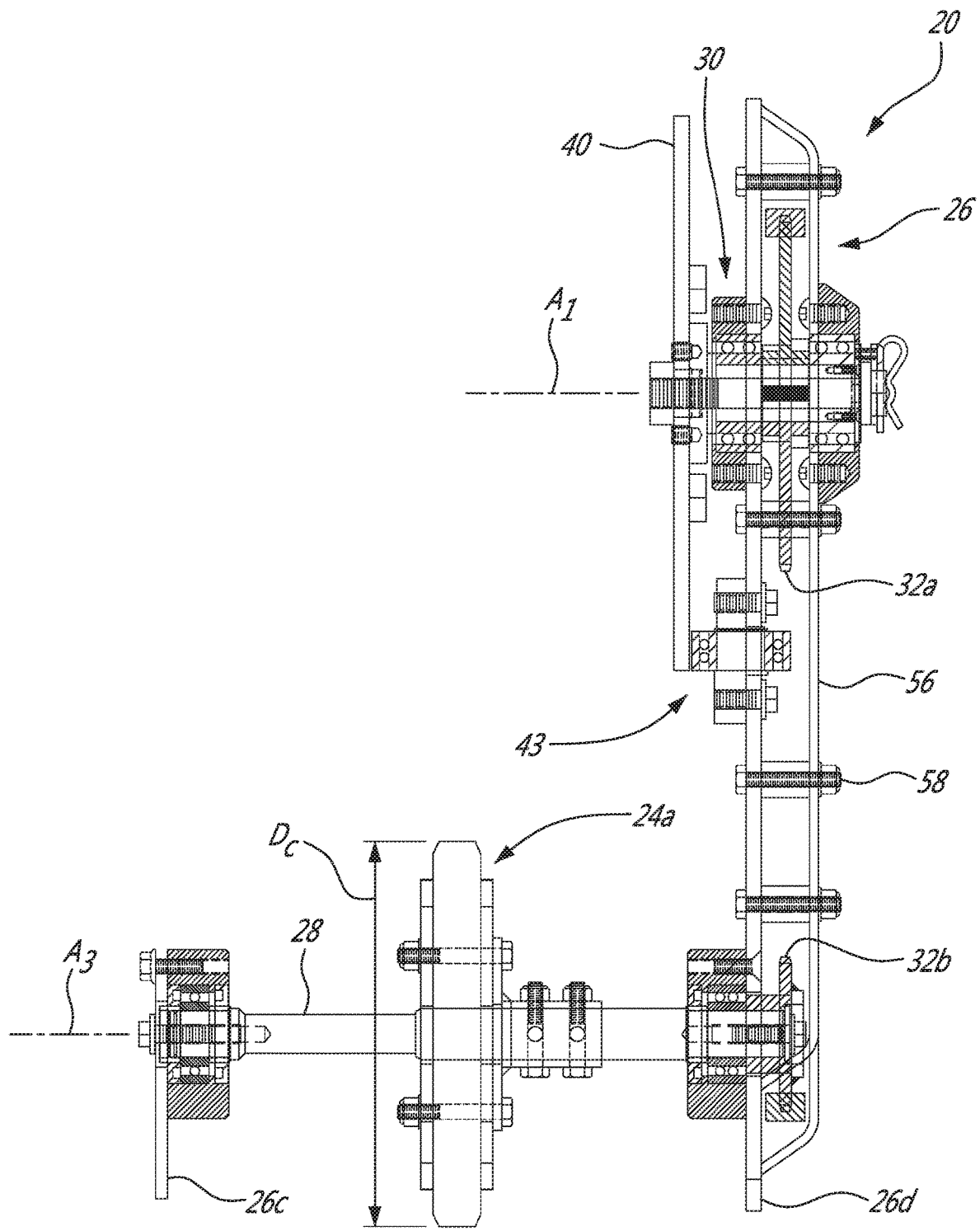
FIG. 4 is a schematic cross-sectional view of the track assembly of FIG. 3.

As seen in FIGS. 3-4, each of the track kits 14 includes a track assembly 20. The track assemblies 20 can have a similar construction to one another (e.g. mirror images), and accordingly a single track assembly will be described in detail in relation with FIGS. 3-4. The track assembly 20 can have an endless track 22 engaged with a track wheel system 24 which includes a plurality of wheels including a track driving wheel 24a and another wheel 24b, which is an idler wheel in the depicted embodiment. The wheels of the track wheel system 24 are rotatably supported in a frame 26, for rotation around interspaced axles 28. An axle engaging device 30 is securable to a driving axle 10b of the vehicle 10, and is also rotatably mounted to the frame 26 around a corresponding axle axis $A_1$ (FIG. 7). The axle engaging device 30 and the track wheel system 24 are held in a specific configuration relative to one another by the frame 26. A mechanism 32, including in this embodiment driving gears (e.g., sprockets) 32a, 32b and a chain 32c, is used to connect the axle engaging device 30 to the track driving wheel 24a. In this embodiment, the frame 26 is not fastened nor secured to the frame of the vehicle 10 in any way. The only connection between the track assembly 20 and the vehicle 10 is via the axle engaging device 30. Accordingly, the track assembly 20 is free to rotate around the driving axle 10b of the vehicle 10. The axle engaging device 30 may be configured as a rotating component whose rotation is directly imparted by the vehicle axle 10b, either by being mounted to the vehicle axle, or by being engaged via another component mounted on the vehicle axle. The other component may be, for instance, the wheel 12 of the vehicle 10 or the tire 12a of the wheel 12. The axle engaging device 30 may therefore be bolted to the vehicle axle 10b, either directly bolted to the axle 10b or indirectly bolted to the axle 10b, such as via a wheel hub, or bolted to a plate with a quick connect arrangement. The plate would be bolted to the axle.

In the embodiment shown, however, during use of the track assembly 20 on the vehicle 10 in a configuration such as shown in FIGS. 1 and 2, the track assembly 20 does not freely rotate around the driving axle 10b. This can be counter-intuitive. Indeed, one would expect friction to result in rotation of the track assembly 20 around the driving axle 10b, which is undesired as it could, for example, damage the vehicle 10. The source of this stability was not easy to identify. It is attributed to the fact that given the specific gear ratios, the diameter of the track driving wheel 24a, and the distance between the vehicle's driving axle and the ground, the speed of advancement of the track is slower than the projection of the angular speed of the vehicle's driving axle against the ground. Indeed, the components can be configured in a manner that when the endless track 26 is engaged with the ground G, and the axle engaging device 30 is rotated by a given angle, the mechanism 32 imparts a displacement of the track around the track wheel system over a track advancement distance that is less than a dimension of a projection of the given angle from the axle axis to the ground.

Figure 5:
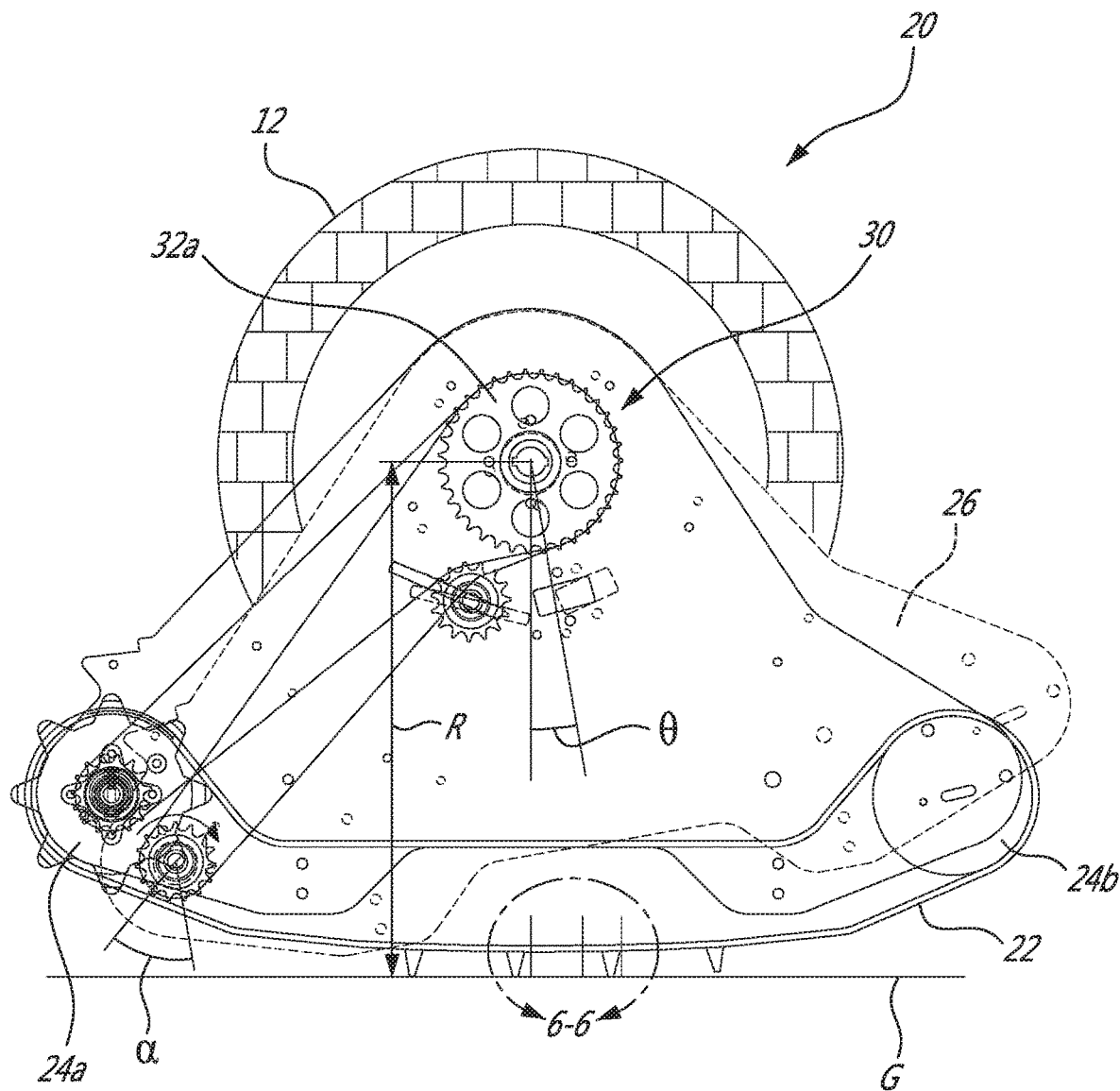
FIG. 5 is a schematic partially transparent side elevation view of the track assembly of FIG. 3 shown in two angular positions.

This is explained with reference to FIGS. 5-6, the track assembly 20 is illustrated in two angular positions. In the embodiment shown, the track assembly 20 is configured such that, when free rotation of the axle engaging device 30 is blocked and when the frame 26 is rotated by a given angle, a point, corresponding to a projection of a reference point of the frame 26 on the ground G, moves from a first position $P_1^0$ to a second position $P_1^1$. This rotation creates a reference point on the endless track 26 to move from a first position $P_2^0$, which coincides to the first position $P_1^0$ of the frame 26, to a second position $P_2^1$.

Figure 6:
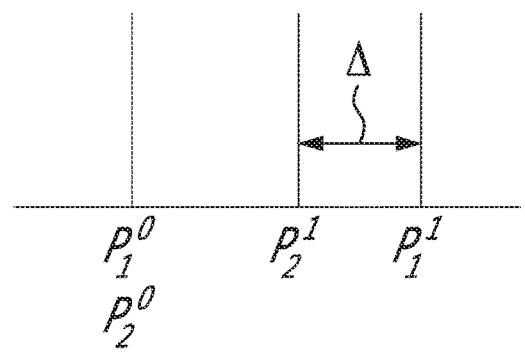
FIG. 6 is an enlarged view of zone 6-6 on FIG. 5.

As shown on FIG. 6, following rotation of the frame 26 around the axis $A_1$ (FIG. 7) a difference in the displacements of the frame 26 and of the endless track 22 appears. This difference is referred herein below as a delay $\Delta$. In the embodiment shown, the delay $\Delta$ has the effect for limiting rotation of the frame 26 relative to the vehicle axle 10b. Stated otherwise, when the vehicle 10 is braking and starts to decelerate, rotation of the wheel 12 and of the axle engaging device 30 secured thereto is limited. Without the combination of the frame 26 and of the mechanism 32, the track assembly 20 might rotate around the vehicle axle 10b because of the friction between the endless track 22 and the ground G. This rotation might result in a contact between the frame 26 and the vehicle 10. This is not desired. In the embodiment shown, the delay $\Delta$ between the frame 26 and the endless track 22 has for effect of bringing the frame 26 back toward its original position. In other words, the movement of the endless track 22 that is less than that of the frame 26 has for effect of limiting the rotation of the frame 26 around the vehicle axle 10b and of bringing the frame 26 toward its original position.

The delay $\Delta$ is function of the diameters of the main driving wheel 32a, $D_a$ (FIG. 3), the secondary driving wheel 32b, $D_b$ (FIG. 3) and of the track driving wheel $D_c$ (FIG. 4), and of the distance R between the rotation axis $A_1$ of the axle engaging device 30 and the ground. The distance R is taken perpendicularly to the ground and perpendicularly to a ground contacting area 22c (FIG. 3) of the endless track 22. The ground contacting area 22c extends parallel to the ground G.

When there is no movement of the endless track 22 relative to the ground G and when free rotation of the axle engaging device 30 is blocked, for instance when the vehicle is accelerating, the track assembly 20 is such that rotation of the frame 22 around the vehicle axle 10b is limited. Therefore, in acceleration, the track assembly 20 might remain, by itself, at a substantially constant orientation relative to the vehicle axle 10b. The track assembly can be auto regulated and damp movements of the track assembly frame 26 relative to the vehicle structure 10a even when the vehicle 10 travels at relatively high speed on an uneven ground G.

More specifically, the displacement of the frame $D_{frame}$ at the ground contacting area following a rotation by an angle θ corresponds to a length of an arc:

$$D_{frame}=R*\theta \qquad (1)$$

The displacement of the track $D_{track}$ corresponds to a length of an arc traveled by a reference point on the track around the track driving wheel that has a diameter $D_c$. The track engaging wheel rotates by an angle α which can be related to the angle θ based on the speed ratio of the mechanism. We have:

$$D_{track}=\alpha*D_c/2 \qquad (2)$$

The speed ratio, SR, can be used to determine the angle of rotation α of the track driving wheel.

$$\alpha=SR*\theta \qquad (3)$$

Hence, $$D_{track}=\theta*SR*D_c/2 \qquad (4)$$

The delay $\Delta$ is therefore expressed as follows:

$$\Delta=D_{frame}-D_{track} \qquad (5)$$

For stability, we want the displacement of the frame to be greater than the displacement of the track. In other words, the delay $\Delta$ should be positive, hence greater than zero, a condition which can be expressed as:

$$D_{frame}>D_{track} \qquad (6)$$

Or, $$R*\theta>\theta*SR*D_c/2 \qquad (7)$$

After simplification, we can express the stability criterion as:

$$R>SR*D_c/2 \qquad (8)$$

By dividing the right-hand and left-hand sides of the equation (8), the stability criterion may be alternately expressed as:

$$1-SR*D_c/2*R)>0 \qquad (9)$$

In other words, the dynamic anti-rotation feature, which limits rotation of the track assembly 20 around the vehicle axle 10b, can be achieved when the distance R is greater than a product of the speed ratio SR generated by the mechanism 32 by a radius of the track driving wheel 24a. It is reminded that the speed ratio is defined as a rotational speed of the track driving wheel 24a over a rotational speed of the axle engaging device 30.

In the embodiment shown, the mechanism 32 includes a main driving wheel 32a and a secondary driving wheel 32b. The main driving wheel 32a is in driving engagement with the secondary driving wheel 32b. The main driving wheel 32a is rotatably mounted to the frame 26 at the frame upper portion 26a and disposed coaxially with the axle engaging device 30. The main driving wheel 32a rotates integrally with the axle engaging device 30. Similarly, the secondary driving wheel 32b is rotatably mounted to the frame 26 at the frame lower portion 26b and disposed coaxially with the track driving wheel 24a. The secondary driving wheel 32b rotates integrally with the track driving wheel 24a.

In the context where the mechanism 32 is a chain and sprocket arrangement, the main driving wheel 32a and the secondary driving wheel 32b are sprockets and are in driving engagement with each other via the chain 32c disposed around the main and secondary driving wheels 32a, 32b. To generate the speed ratio, the diameter $D_a$ of the main driving wheel 32a is greater than the diameter $D_b$ of the secondary driving wheel 32b. Therefore, a rotational speed of the secondary driving wheel 32b corresponds to a ratio of the diameter of the main $D_a$ and secondary $D_b$ driving wheels 32a, 32b multiplied by a rotational speed of the main driving wheel 32a. It will be understood that other transmitting mechanisms than chain and sprocket arrangements may be used to drivingly engage the axle engaging device 30 with the track driving wheel 24a, such as, for instance, belts and pulleys and/or gears, without departing from the scope of the present disclosure.

In the depicted embodiment, the distance R between the axle engaging device axis of rotation $A_1$ and the ground G is 20.6 inches, the diameter $D_a$ of the main driving wheel 32a is 7.1 inches, the diameter $D_b$ of the secondary driving wheel 32b is 2.9 inches and the diameter $D_c$ of the track driving wheel 24a is 6.7 inches. Hence, for a rotation of the frame 26 of 10°, while rotation of the axle engaging device 30 is blocked, the reference point of the endless track moves by 1.4 inches whereas the projection of the reference point of the frame moves by 3.6 inches. In such a case, the delay Δ is of 2.1 inches. As aforementioned, such a delay Δ might cause the frame 26 to automatically repositions itself relative to the endless track 22. The above calculations might be slightly modified to cater to a distortion of the endless track 22 when rotating. However, such a distortion is not expected to significantly change the above numbers.

Hence, in the embodiment shown, the speed ratio is function of the diameter of the main and secondary driving gears 32a, 32b. And, the product of the speed ratio ($D_a/D_b=7.1/2.9=2.4$) by the radius of the track driving wheel ($D_c/2=6.7/2=3.3$) corresponds to 8.1 which is less than the distance R of 20.6 inches. The criterion is therefore met. In a particular embodiment, any track system that meets the above criterion will present an autoregulation. The speed ratio may be calculated with a ratio of a number of teeth of the main driving wheel 32a over a number of teeth of the secondary driving wheel 32b.

In alternate embodiments, the exact delay, or the exact ratio of the diameter of the main driving wheel $D_a$ over the diameter of the secondary driving wheel $D_b$ can vary. The ratio of $\Delta/D_{frame}$ can be between 0.3 and 0.95 for instance, which can provide satisfactory damping/stability in static conditions (e.g. during acceleration, braking or pulling charges at lower speeds). However, it was found that to provide satisfactory damping/stability in dynamic conditions (e.g. when going on uneven, bumpy terrain at speeds above 25 km/hour or such as between 30 and 40 km/hour), it was preferred to have a ratio of $\Delta/D_{frame}$ of above 0.45. It can be desired to select a ratio between 0.5 and 0.8 for instance. In the illustrated embodiment, the ratio was of about 0.6, which was found very satisfactory.

Using equation (9) rather than equation (8), the stability criterion implies that the distance R corresponds to at least 1.8 times the product of the speed ratio SR by a radius $D_c/2$ of the track driving wheel 24a. Preferably, the distance R ranges from 2 to 5 times the product of the speed ratio SR by the radius $D_c/2$ of the track driving wheel 24a, In the embodiment shown, the ratio of 0.6 means that distance R corresponds to 2.5 times the product of the speed ratio SR by a radius $D_c/2$ of the track driving wheel 24a The track assembly 20 may be achieved with the features of FIG. 7. As shown, the track assembly frame 26 has an upper portion 26a and a lower portion 26b. In the embodiment shown, the frame 26 is made of aluminum 6061-T6. Any suitable material may be used. The track driving wheel 24a might cooperates with transversal lugs defined on and inner side of the endless track 22 or with bridging webs, whichever the endless track 22 includes. It is understood that more than one track driving wheel 24a and more than one idler wheel 24b might be simultaneously rotatably supported on the axles 28.

The frame 26 includes an inside plate 26c and an outside plate 26d, spaced-apart from the inside plate 26c by the axles 28. The frame upper portion 26a is defined by the outside plate 26d. The frame lower portion 26c is defined by both the outside and inside plates 26c, 26d. The inside and outside plates 26c, 26d are connected to each other via the axles 28 of the track wheel system 24. Two of the axles 28 are shown on FIG. 3 and correspond to widener axles 28a. Other axles extends perpendicularly from the inside plate 26c to the outside plate 26c. These other axles are used to pivotally receive wheels surrounded by the endless track 22 and are therefore not visible on FIG. 3.

As shown in FIG. 7, the two widener axles 28a are used to create a longitudinal space S adjacent the frame upper portion 26a to receive the wheel 12. In a particular embodiment, without the widener axles 28a, the wheel 12 might contact an outer side 22a of the endless track 22 which is not desired. As illustrated, the endless track outer side 22a has lugs 22b configured to engage the ground G and to enhance traction. To allow the endless track 22 to smoothly deviate around the widener axles 28a, the track wheel system 24 further includes track gears 24c rotatably mounted on the widener axles 28. Two of the track gears 24c are mounted on each of the widener axles 28a and are located adjacent a respective one of the inside and outside plates 26c, 26d. A plurality of slots $24c_1$ are circumferentially distributed around each of the track gears 24c and are configured to mate with the lugs 22b of the endless track outer side 22a. Other configurations are contemplated.

When the track assembly is mounted to the wheels 12, the upper portion 26a is secured to one of the wheels 12 of the motorized vehicle 10 and the lower portion 26b is below the one of the wheels 12. In the embodiment shown, the axle engaging device 30 is configured to be mounted to the one of the wheels 12 and to rotate integrally therewith. The track assembly 20 is secured to the vehicle 10 solely via the axle engaging device 30.

Referring more particularly to FIG. 8, each of the track kits 14 further includes a mounting plate 40 to be secured to one of the wheels 12 of the motorized vehicle 10. Once secured, the mounting plate 40 rotates integrally with the one of the wheels 12. In the embodiment shown, the track assembly 20 is rotatably secured to the vehicle 10 via the mounting plate 40 and the axle engaging device 30. It is understood that the mounting plate 40 might be replaced by wheels that are designed to be adapted to be secured to the track assemblies 20 via the axle engaging device 30.

In the embodiment shown, the tires 12a, which might remain secured to the vehicle 10 when the track assemblies 20 are secured thereto, are located adjacent to the frame upper portion 26a and are above the frame lower portion 26b. Hence, a width W of the frame lower portion 26b might be slightly greater than that of the tires 12a. Hence, in the depicted embodiment, an increase in a width of the vehicle might be minimal compared to other systems. In the embodiment shown, a clearance distance between the vehicle and the ground is increased by 7 inches by installing the track kits 14 on the vehicle 10.

Referring to FIGS. 3 and 7, as shown, the track wheel system 24 further includes a plurality of intermediary idler wheel rows 42 disposed between the idler wheel 24b and the track driving wheel 24a. Each rows 42 includes intermediary idler wheels 42a rotatably mounted on axles 42b, which extend perpendicularly from the inside plate 26c to the outside plate 26d of the frame 26 and which are parallel to each other. Each one of the intermediary idler wheels 42a has a peripheral portion in contact with an inner side of the endless track 22 and rotates therewith. The intermediary idler wheels 42a have a diameter less than that of the idler wheel 24b.

In the embodiment shown, the intermediary idler wheels 42a of two consecutive rows 42 are disposed in a staggered relationship. However, it is appreciated that the intermediary idler wheels 42a of consecutive rows 42 can be in the same planes, i.e. aligned with one another. It is understood that the plurality of intermediary idler wheels 42a may be replaced by rails that slidingly engage the inner side of the endless track 22 without departing from the scope of the present disclosure.

In some instances, non-negligible flexion forces might be imparted to the vehicle axle 10b and to the axle engaging device 30 when the vehicle is steered. In the embodiment shown, the track assembly 26 further includes a roller 43 that is rotatably mounted to the frame 26 at the upper portion 26a on the outside plate 26d and that rollingly contacts the mounting plate 40 to obviate at least a portion of this flexion force. The roller 43 is spaced apart from the axle engaging device 30 relative to a direction $d_1$ perpendicular to an axis of rotation $A_1$ of the axle engaging device 30. The roller 43 is positioned adjacent a peripheral edge 40a of the mounting plate 40 to maximise obviation the flexion forces. An axis of rotation $A_2$ of the roller 43 intersects the axis of rotation $A_1$ of the axle engaging device 30 such that the mounting plate 40 may induce rotation of the roller 43 via a contact therebetween. The roller 43 may be any suitable roller bearing.

It is also possible to adjust the tension of endless track 26 with a tension adjusting assembly 44. As shown, the inside and outside plates 26c, 26d include slotted apertures 26e in which the axle 28 of the idler wheel 24b is slidingly received. By displacing said axle 28 within the slotted apertures 26e, the tension of the endless track 22 might be increased or decreased. The tension adjusting mechanism 44 includes a cam 44a rotatably mounted on the axle 28 and having a toothed edge 44b that is in engagement with a pin 44c mounted on the frame 26. The pin 44c maintains the cam 44a in a given position relative to the frame 26 for maintaining a desired tension in the endless track 22. It is understood that the endless track 22 might elongate with wear. To cater to this wear-induced elongation, the cam 44a might be rotated to increase tension in the track 22. Any suitable tensioning mechanism known in the art might be used.

Figure 9:
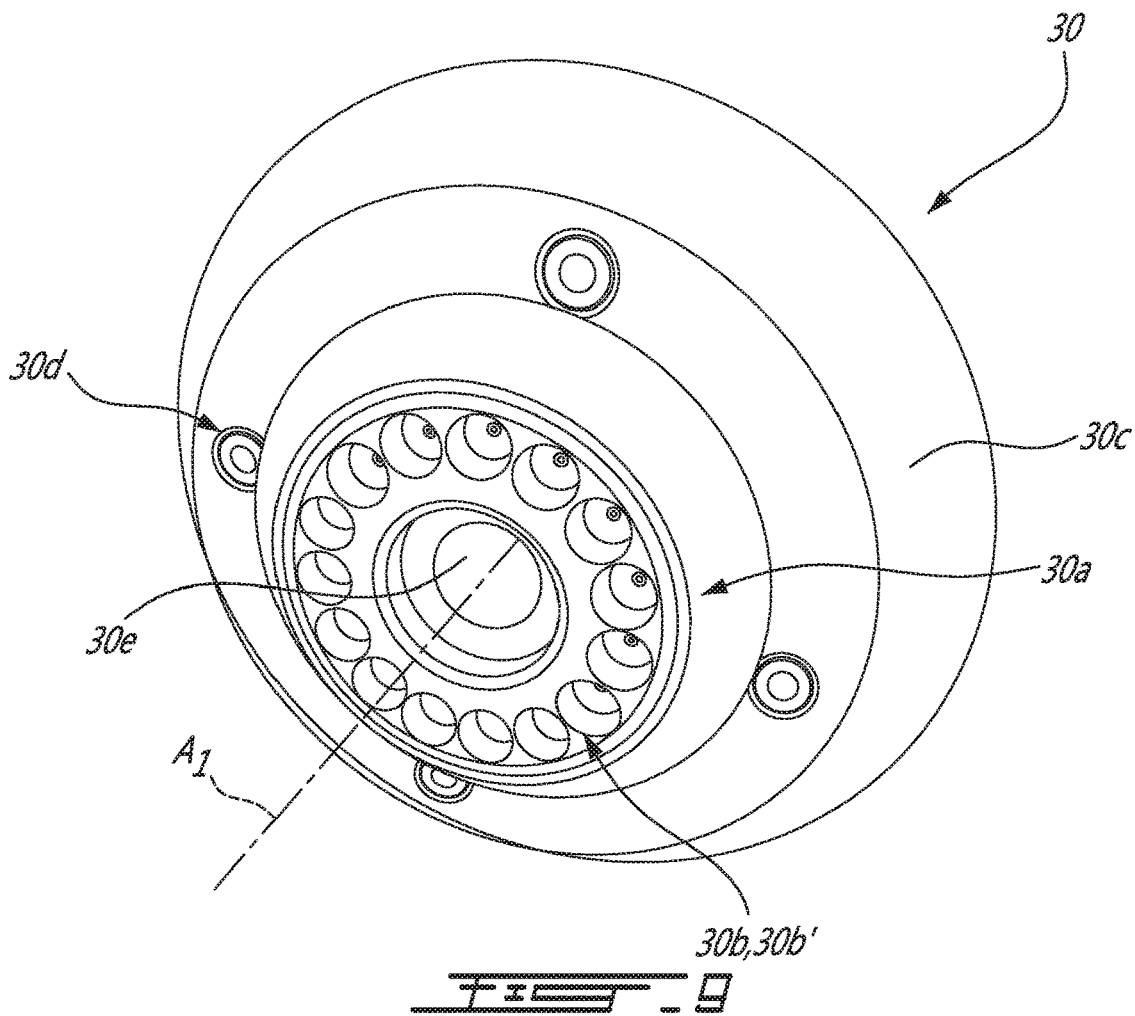
FIG. 9 is an enlarged view of a portion of FIG. 7.
Figure 10:
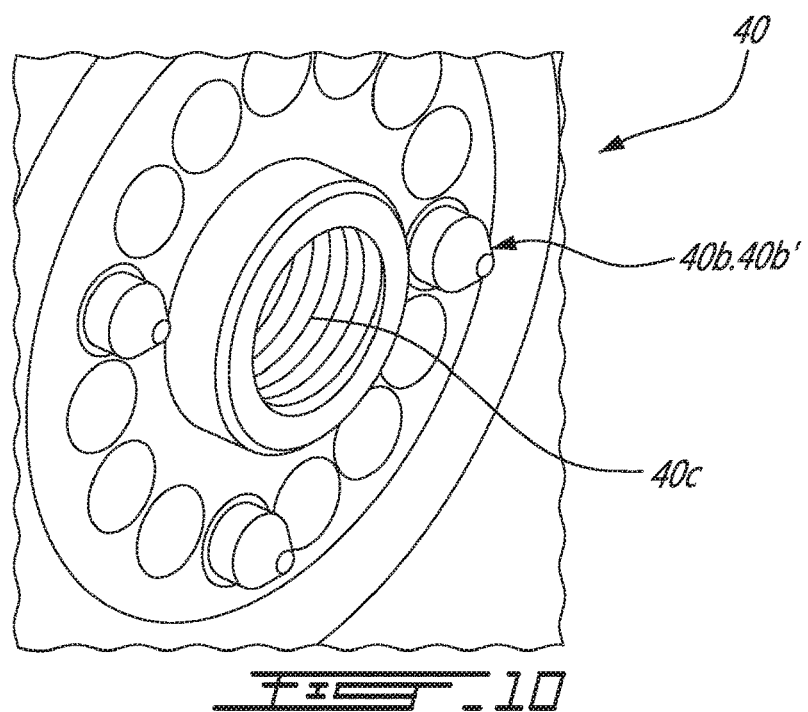
FIG. 10 is an enlarged view of a portion of FIG. 8.

The track kit 14 must be able to transfer rotation from the wheel 12 to the axle engaging device 30. This function might be carried by the features illustrated in FIGS. 9-10. As shown, the axle engaging device 30 includes an annular member 30a that defines a plurality of features 30b' that mate with corresponding features 40b' of the mounting plate 40. In the embodiment shown, the features 30b' are holes 30b and the corresponding features 40b' are studs 40b extending perpendicularly away from the mounting plate 40. The holes 30b slidingly receive the studs 40b and, once in engagement, the studs 40b transfer the rotational input of the wheel 12 to the axle engaging device 30 secured thereto via the mounting plate 40. In the embodiment shown, a number of the studs 40b is less than a number of the holes 30b. Other configurations are contemplated. It is understood that the holes 30b may be defined in the mounting plate 40 and the studs 40b may be defined by the axle engaging device 30 without departing from the scope of the present disclosure.

In the embodiment shown, the axle engaging device 30 further includes an outer piece 30c secured to the frame outside plate 26d via fasteners 30d. The annular member 30a and the outer piece 30c are able to rotate relative to each other. Roller balls (not shown) are disposed radially between the annular member 30a and the outer piece 30c relative to the axis of rotation $A_1$ of the annular member 30a to provide a sliding movement between the annular member 30a and the outer piece 30c.

To secure the track assembly 20 to the mounting plate 40, the axle engaging device 30 has an aperture 30e defined by the annular member 30a, The aperture 30e slidingly receives a threaded bolt (not shown) that engages a threaded aperture 40c of the mounting plate 40. Hence, in the depicted embodiment, the track assembly 20 is secured to the one of the wheels 12 of the motorized vehicle 10 solely via the threaded bolt. The threaded bolt is used to maintain the studs 40b of the mounting plate 40 in engagement with the holes 30b of the annular member 30 to ensure that the wheel 12 is able to transfer its rotational input to the track assembly 20 via the axle engaging device 30.

In the embodiment shown, the track driving wheel 24a of a track assembly 20 that is located at the front of the vehicle 10 is located rearward to one of the axles 10b (FIG. 1), which is at the front of the vehicle 10. The track driving wheel 24a of a track assembly 20 that is located at the rear of the vehicle 10 is located forward to the other of the axles 10b of the vehicle 10. Hence, the track driving wheels 24a of all four of the track assemblies 20 of the vehicle 10 are located between the axles 10b of the vehicle 10. Stated otherwise, the track driving wheels 24a of the track assemblies 20 mounted respectively at the front and at the rear of the vehicle 10 face each other. The idler wheels 24b of said track assemblies 20 are oriented away from one another. Therefore, idler wheels 24b of two out of the four track assemblies 20 are always in front of one of the vehicle axles 10b regardless of a direction of travel of the vehicle 10 when the vehicle is equipped with four of the disclosed track assemblies 20.

Referring back to FIG. 3, in this embodiment, each of the track assemblies 20 includes an anti-diving flap 52 secured to the frame 26 and extending from one end of the track assembly 26. When mounted to the vehicle 10, as shown in FIG. 1, the anti-diving flap 52 is oriented in a direction which is outward relative to the vehicle 10 (i.e. the front end if the front axle or the rear end if the rear axle). More specifically, the anti-diving flap 52 has a flat body 52a which extends obliquely, both longitudinally and upwardly, from a corresponding end of a corresponding endless track 22. The flat body 52a of the anti-diving flap 52 has approximately the same width as the endless track 22. The length of the flat body is small compared to the length of the endless track belt. The anti-diving flap 52 is described in more detail in U.S. patent application published under number US 2017/0158267 and which is incorporated herein by reference.

In the embodiment shown, the endless track 22 is provided with a plurality of stiffeners extending in a widthwise direction that is parallel to the axis of rotation $A_1$ (FIG. 7) of the axle engaging device 30 and of the wheels 12. The stiffeners cover a whole width of the endless track 22. In a particular embodiment, the disclosed endless track 22 allows maximal traction and buoyancy compared to other endless track that do not present similar stiffeners.

In the embodiment shown, the track assembly 20 further includes a cover plate 56 (FIG. 8) that is affixed over the frame outside plate 26d to protect the mechanism 32 against granular material that might corrupt rotation of the chain 32c. As shown, the cover plate 56 is secured to the frame 26 via threaded fasteners 58.

In a particular embodiment, the endless track 26 creates a power loss of about 40% and the disclosed speed ratio, which creates an increase of the rotation speed of the track driving wheel 24a relative to the wheels 12 of the vehicle, compensate at least in part this power loss.

Referring back to FIG. 7, in the embodiment shown, the track assembly 20 further includes a tensioner 54 for maintaining a given tension in the chain 32c. In a particular embodiment, maintaining the given tension precludes teeth of the main and secondary driving wheels 32a, 32b from skipping relative to the chain 32c. Moreover, in some cases, the chain 32c tends to elongate with wear over time. In a particular embodiment, the tensioner 54 is configured to cater to the elongation of the chain 32c to prolong its lifetime.

Figure 11:
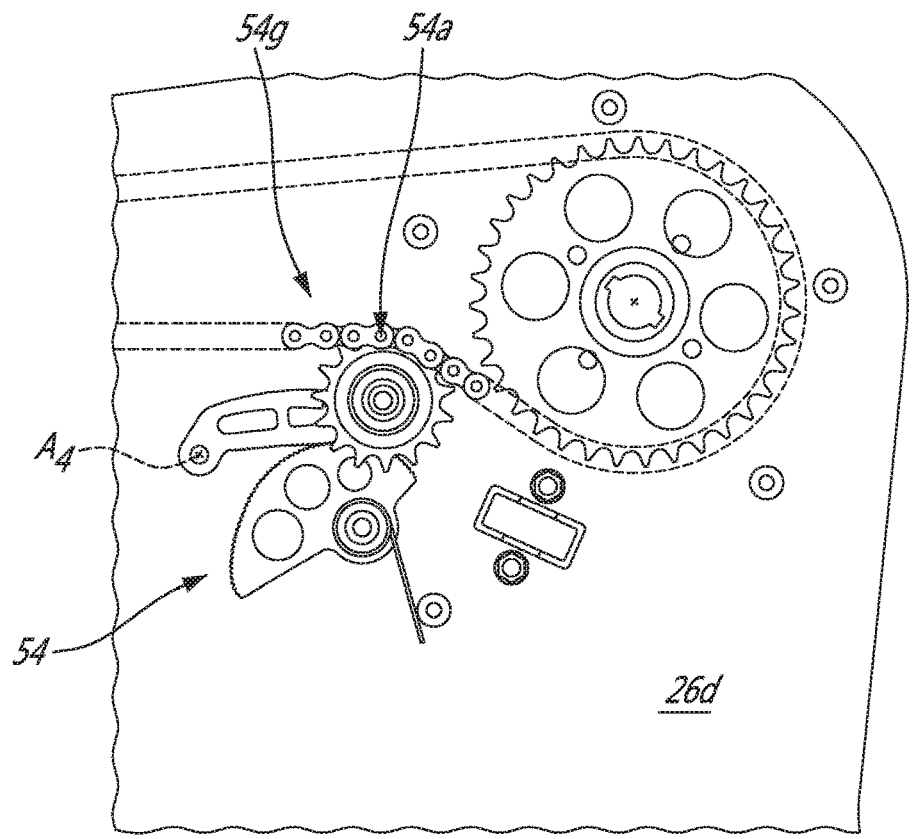
FIG. 11 is a schematic three-dimensional view of a chain tensioner of the track assembly of FIG. 7 in accordance with one embodiment.
Figure 12:
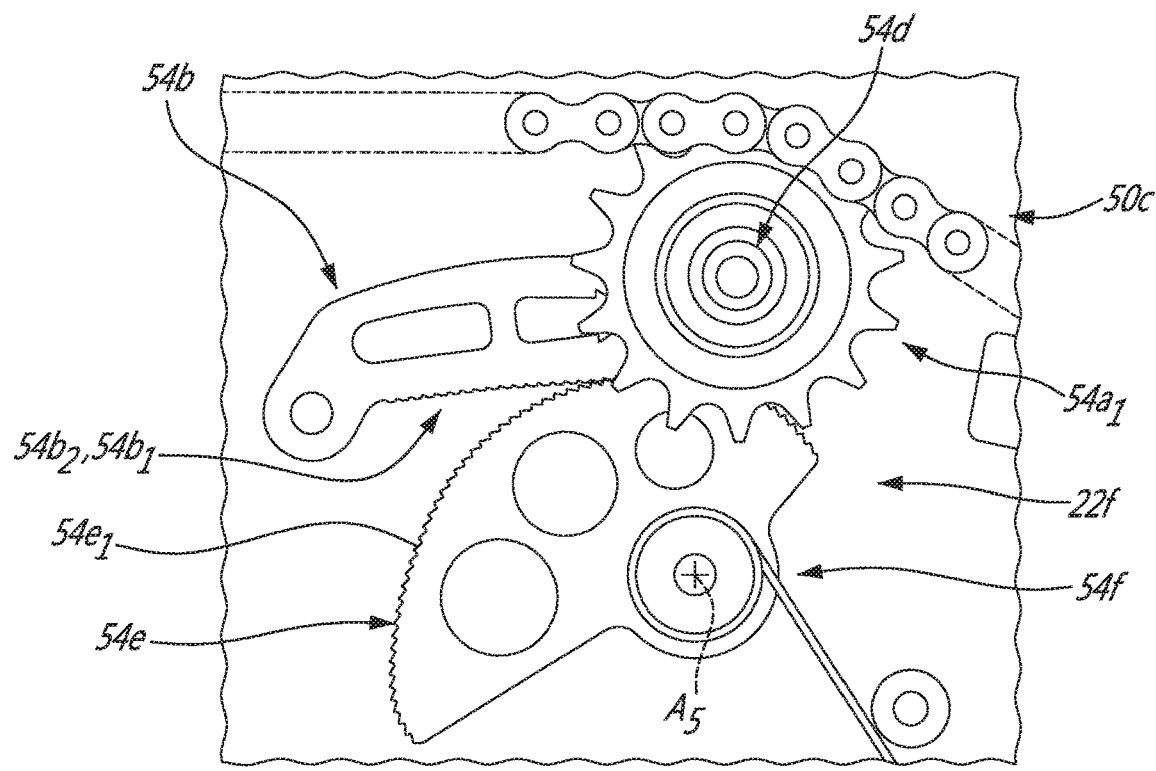
FIG. 12 is an enlarged view of a portion of FIG. 11.

The tensioner 54 can be achieved with the features illustrated in FIGS. 11-12. As shown, the tensioner 54 includes a sprocket 54a rotatably mounted on an arm 54b The sprocket 54a is in driving engagement with the chain 32c via teeth $54a_1$ of the sprocket 54a. The arm 54b is pivotally mounted on the frame upper portion 26a, on the frame outside plate 26d, for rotation about a rotational axis $A_4$. The arm 54b is located on an exterior side of the frame 26 that faces away from the wheel 12 when the track assembly 20 is mounted on the vehicle 10. In the embodiment shown, the tensioner 54 further includes a second arm 54c (FIG. 3) pivotally mounted on the frame upper portion 26a, on the frame outside plate 26d, and located on an interior side of the frame 26 that faces toward the wheel 12 when the track assembly 20 is mounted on the vehicle 10. The arm 54b and the second arm 54c rotate relative to the frame upper portion 26a about the same axis of rotation $A_4$.

As shown, the sprocket 54a is rotatably mounted to both of the arm 54b and the second arm 54c. Ends of the arm and second arm 54b, 54c that are opposed to their axis of rotation $A_4$ are linked via a pivot 54d that is slidingly received in a slot 26f defined through the frame outside plate 26d at the frame upper portion 26a. The sprocket 54a is rotatably mounted on the pivot 54d that links the two arms 54b, 54c, A shown, movements of the sprocket 54a relative to the frame outside plate 26d is guided by the slot 26f defined there through.

In the embodiment shown, the tensioner 54 further has a cam 54e rotatably mounted on the frame outside plate 26d for rotation about an axis of rotation $A_5$ that is offset from that of the two arms $A_4$. A curved edge $54e_1$ of the cam 54e is in abutment against the arm 54b. The tensioner 54 further has a biasing member 54f, such as a spring, that biased the cam 54e in rotation in a clockwise direction to increase a contact force between the cam edge $54e_1$ and the arm 54b and that pushes the sprocket 54a in engagement with the chain 32c. Therefore, as the chain 32c elongates with wear, the biasing member 54f induces rotation of the cam 54e, which pushes on the arm 54b to keep the sprocket in engagement with the chain 32c.

As illustrated, a surface $54b_1$ of the arm 54b that is in contact with the edge 54e of the cam 54e is toothed. In a particular embodiment, the contact of teeth $54b_2$ of the surface $54b_1$ of the arm 54b with the edge $54e_1$ of the cam 54 precludes undesired movements of the sprocket 54a that might result in tooth skipping. Stated otherwise, the teeth $54b_2$ of the arm 54b might preclude the cam 54e from rotating in an counter clockwise direction and hence might preclude temporary slacking of the chain 32c. As shown, the teeth $54b_2$ of the arm 54b are oriented toward the sprocket 54a and are configured to "bite" in the edge $54e_1$ of the cam 54e when said cam 54e rotates in the counter clockwise direction. Other configurations are contemplated.

Any tensioner that is suitably light and thin might be used without departing from the scope of the present disclosure.

The tensioner 54 includes an indicator 54g of a level of wear of the chain 32c. In the embodiment shown, the indicator 54g is visual and corresponds to a position of the second arm 54c relative to the slot 26f. Markings might be provided on the frame outside plate 26d to indicate that a certain position of the second arm 54c means that the track assembly 20 is due for maintenance.

In the embodiment shown, an external diameter of the wheels 12 is at most 28½ inches, the vehicle 10 has a weight of at most 4000 lbs, and a wheelbase of the vehicle, taken from one of the axles 10b to the other, is at most 51 inches. Other configurations might be possible. The disclosed track assembly 20 has a weight of 115 lbs and offers a ground contacting area 26c of 53½ inches in length by 12 inches in width. Therefore, a total ground contacting area 26c of the motorized vehicle 10 equipped with four track assemblies 20 is 2568 square inches.

It might be more difficult to steer the vehicle 12 when equipped with the track assemblies 20 because the greater ground contacting area, compared to that of tires, generates more friction. Therefore, the vehicle 12 is preferably equipped with a servo-direction.

Figure 13:
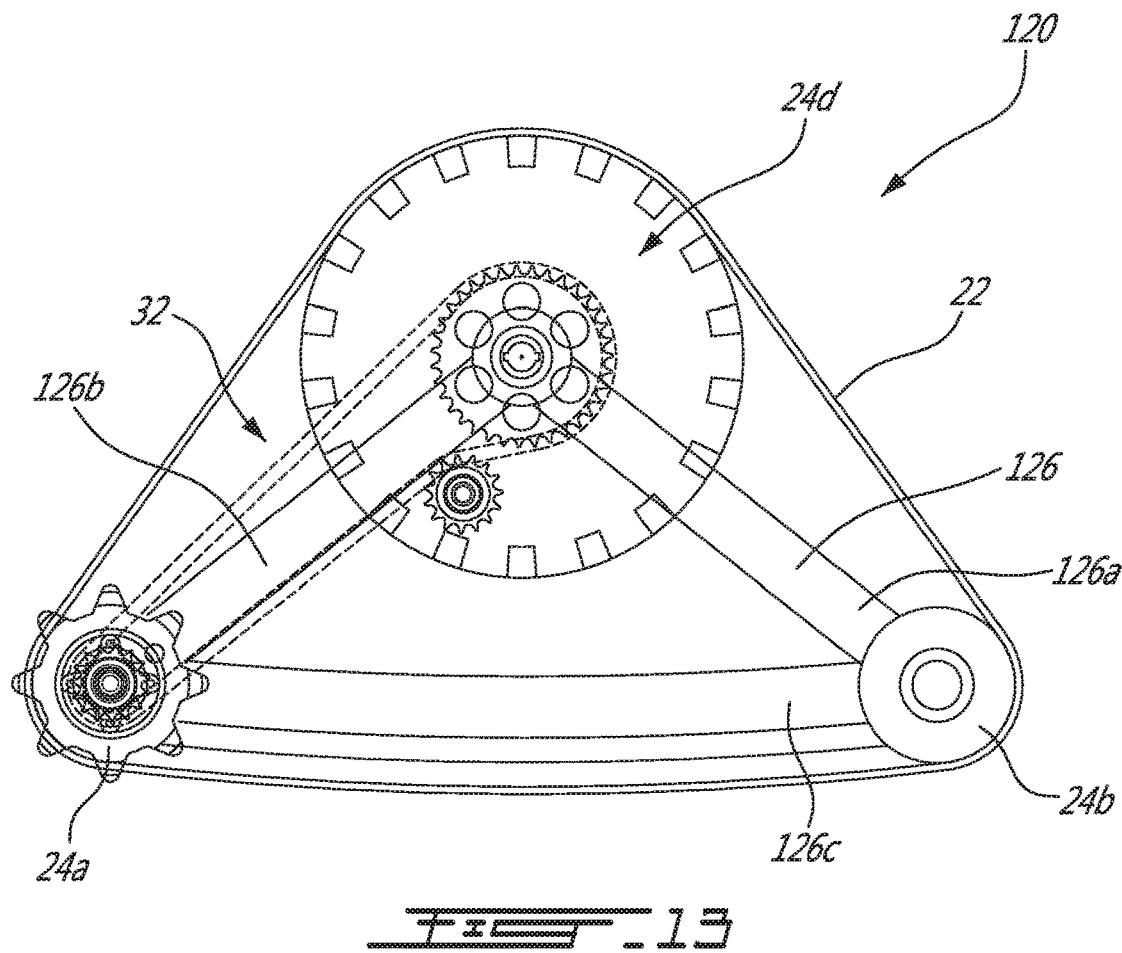
FIG. 13 is a schematic side elevation view of a track assembly in accordance with another embodiment.
Figure 14:
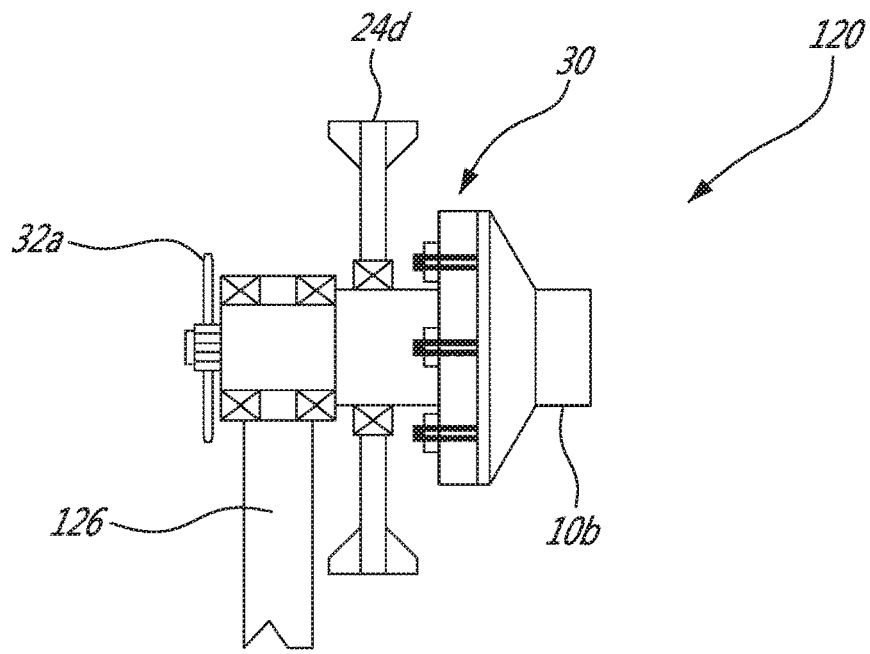
FIG. 14 is a schematic cross-sectional view of the track assembly of FIG. 13.

Referring now to FIGS. 13-14, a track assembly 120 in accordance with another embodiment is illustrated. For the sake of simplicity, only elements that are different from the track assembly 20 described herein above are described.

The track assembly 120 includes a frame 126 that has three members 126a, 126b, and 126c defining a triangular shape. One of the three members 126c is parallel to the ground and extends between the track driving wheel 24a and the idler wheel 24b that are rotatably mounted on the frame 126. In the embodiment shown, the track assembly 120 further includes a central idler wheel 24d rotatably mounted to the frame 126 at an apex of the triangular shape. More specifically, the central idler wheel 24d is rotatably mounted at an intersection between the others of the three members 126a, 126b. The endless track 22 is disposed around the track driving wheel 24a, the idler wheel 24b, and the central idler wheel 24d The central idler wheel 24d rotates freely about the frame 126 and about the vehicle axle 10b. Stated otherwise, the central idler wheel 24d is not configured to transfer torque to the endless track 22. Rather, the central idler wheel 24d rotates because it is surrounded by the endless track 22 whose rotation is induced by the vehicle axle 10b that engages the mechanism 32 that engages the track driving wheel 24a.

In conventional track assemblies, the central idler wheel 24d is a driving wheel because it is drivingly engaged by the vehicle axle 10b, either directly or via the tire 12a. In such conventional track assemblies, the endless track is engaged directly by the central idler wheel and no mechanism is provided. Therefore, the disclosed track assembly 120 may be seen as an existing track assembly modified to include the mechanism 32 that creates the static and dynamic damping features discussed herein above.

Referring now to FIG. 15, teeth are provided on both the arm 54b and on the cam 54e (FIG. 12). Therefore, engagement of the teeth on the arm 54b with teeth on the cam 54e provides a ratchet mechanism 60, which precludes or limits rotation of the cam 54e in the counter clockwise direction. In a particular embodiment, experimentations have demonstrated that having teeth on both of the arm 54b and the cam 54e offers a better retention of the tension in the chain 32c compared to a configuration without teeth or with teeth only on one of the arm 54b and the cam 54e.

Referring back to FIG. 1, as illustrated, the track assemblies 20 at the front are oriented in a same manner as the track assemblies 20 at the rear of the vehicle 10 such that the track driving wheels 24a are always located rearward of the idler wheels 24b of each of the track assemblies 20. In a particular embodiment, such a configuration offers better performances than a configuration having the track driving wheel 24a forward of the idler wheel 24b because a weight of the vehicle 10 typically leans toward the rear of the track assemblies 20 when the vehicle advances, Therefore, still in accordance with a particular embodiment, having the track driving wheels 24a located at the rear of each of the track assemblies 20 allows a more direct engagement between the axle engaging device 30 and the ground G via the mechanism 32 and the endless track 22 because the mechanism 32 is not required to work to compensate for a slack in the endless track 22. Stated otherwise, in this particular embodiment, when the track driving wheel 24a rotates, it directly imparts rotation on the endless track 22 at a location on the endless track 22 that is directly aligned with a location where a major portion of the weight of the vehicle 10 is transferred to the ground G. Moreover, still in accordance with a particular embodiment, such a configuration imparts less stress on the track wheels 24c and on their respective axles 28a compared to a configuration having the track driving wheel 24a forward of the idler wheel 24b.

Referring to all Figures, for securing the track assemblies 20 to the vehicle 10, each of the track assemblies 20 is secured to a respective one of the wheels 12 of the vehicle 10 via the axle engaging device 30. In the embodiment shown, the vehicle 10 is raised from the ground G such as to allow the track assembly lower portions 26b to be slid below the tires 12. In the embodiment shown, the holes 30b of the axle engaging device 30 are engaged by the studs 40b of the mounting plate 40 such that the mounting plate 40 rotates integrally with the axle engaging device 30. It is understood that the mounting plate 40 might be secured to one of the wheels 12 or directly to the vehicle axle 10b. Then, a threaded bolt is inserted in the registering apertures 30e, 40c of the mounting plate 40 and of the axle engaging device annular member 30a. The threaded bolt is screwed such as to keep the studs 40b of the mounting plate 40 in engagement with the holes 30b. At which point, the vehicle 10 may be lowered such that the endless track 26 is in contact with the ground G.

In the embodiment shown, the mounting plates 40 are secured to the wheels 12 of the vehicle 10. This might be achieved by removing fasteners that originally secure the wheels 12 to the vehicle structure 10a and by replacing said fasteners by replacement fasteners that are longer in length to accommodate a thickness of the mounting plate 32. It is understood that the mounting plate 40 might be tailored to the vehicle 10 such that a bolt pattern of the mounting plate 40 matches a bolt pattern of the wheels 12. Alternately, the mounting plate 40 might define a plurality of apertures to match more than one bolt pattern. In the embodiment shown, the mounting plates 40 might remain secured to the vehicle 10 although the track assemblies 20 are detached from the vehicle 10. This might allow for quick installation and removal of the track assemblies on and off the vehicle.

In a particular embodiment, the ability to secure the track assembly 20 to the vehicle 10 solely via the axle engaging device 30 allows for an easy and rapid installation of the track assemblies 20 to the vehicle 10. In a particular embodiment, the four track assemblies 20 are installed in less than three minutes by a unique person. Therefore, still in accordance with a particular embodiment, a user may easily adapt the motorized vehicle 10 to the road conditions without complicated tools and special expertise.

In the embodiment shown, all of the wheels/gears are mounted on their respective axles via bearing that are sealed to prevent debris ingestion. In a particular embodiment, a figure of the closed loop created by the endless track 22 is such that almost no debris (e.g., dirt, snow) is projected in a direction extending away from the ground G. The disclosed track assembly 20 might offer enhanced performances and manoeuvrability at least in side hilling condition compared to prior art systems.

As can be understood, the examples described above and illustrated are intended to be exemplary only. The scope is indicated by the appended claims.

What is claimed is:

1. A track assembly for a motorized vehicle having at least one driven axle, the track assembly comprising a frame; an endless track engaged with a track wheel system, the track wheel system having a track driving wheel and at least another wheel being rotatably mounted to the frame about respective axles, the endless track in driving engagement with the track driving wheel; an axle engaging device rotatably mounted to the frame about a corresponding axle, the axle engaging device being securable to the at least one driven axle and being drivable into rotation by the at least one driven axle, an axis of rotation of the axle engaging device spaced apart from a ground contacting area of the endless track by a distance taken along an axis perpendicular to the ground contacting area; and a mechanism drivingly engaging the axle engaging device to the track driving wheel, the mechanism transmitting a rotation of the axle engaging device to the track driving wheel, the mechanism defining a speed ratio defined as a rotational speed of the track driving wheel over a rotational speed of the axle engaging device, the distance greater than a product of the speed ratio by a radius of the track driving wheel thereby providing an anti-rotation feature to limit rotation of the track assembly about the at least One driven axle.

2. The track assembly of claim 1, wherein the distance corresponds to at least 1.8 times the product of the speed ratio by the radius of the track driving wheel.

3. The track assembly of claim 2, wherein the distance ranges from 2 to 5 times the product of the speed ratio by the radius of the track driving wheel.

4. The track assembly of claim 1, wherein the mechanism includes a main driving wheel and a secondary driving wheel in driving engagement with the main driving wheel, the main driving wheel rotatable relative to the frame and disposed coaxially with the axle engaging device and rotating integrally therewith, the secondary driving wheel rotatable relative to the frame and disposed coaxially with the track driving wheel and rotating integrally therewith.

5. The track assembly of claim 4, further comprising a chain disposed around the main driving wheel and the secondary driving wheel, the chain drivingly engaging the main driving wheel with the secondary driving wheel.

6. The track assembly of claim 1, wherein the mechanism includes a chain for drivingly engaging the axle engaging device and the track driving wheel, the mechanism further including a tensioner for maintaining a tension in the chain.

7. The track assembly of claim 6, wherein the tensioner includes a sprocket rotatably mounted on an arm and engaged by the chain, the arm pivotally mounted on the frame, the tensioner further having a cam rotatably mounted on the frame and a biasing member biasing an edge of the cam in abutment against the arm such that the sprocket is pushed in engagement with the chain by the cam.

8. The track assembly of claim 7, wherein an engagement of the arm with the cam defines a ratchet mechanism for limiting rotation of the cam in a given direction.

9. The track assembly of claim 1, further comprising a roller rotatably mounted to the frame and spaced apart from the axle engaging device along a radial distance relative to an axis of rotation of the axle engaging device, the roller configured for being in a rolling contact with one of the wheels, an axis of rotation of the roller intersecting the axis of rotation of the axle engaging device.

10. The track assembly of claim 1, wherein the axle engaging device includes an annular member defining a plurality of features configured for mating with corresponding features on one of the, the features and the corresponding features configured to be matingly engaged for transferring a rotational input of the one of the one of the wheels to the axle engaging device.

11. The track assembly of claim 10, wherein the features are holes and the corresponding features are studs configured to be slidably received within the holes.

12. A motorized vehicle comprising two axles, at least one of the two axles being driven, the motorized vehicle further including at least two track assemblies mounted on the at least one of the two axles, each of the at least two track assemblies having a frame; an endless track engaged with a track wheel system, the track wheel system including a track driving wheel and another wheel rotatably mounted on the frame about respective axles, the endless track in driving engagement with the track driving wheel; an axle engaging device rotatably mounted on the frame about a corresponding axle, the axle engaging device drivingly engaged by the at least one of the two axles, an axis of rotation of the axle engaging device spaced apart from a ground contacting area of the endless track by a distance taken along an axis perpendicular to the ground contacting area, each of the track assemblies secured to the motorized vehicle solely via the axle engaging device; and a mechanism drivingly engaging the axle engaging device with the track driving wheel, the mechanism transmitting a rotation of the axle engaging device to the track driving wheel, the mechanism defining a speed ratio defined as a rotational speed of the track driving wheel over a rotational speed of the axle engaging device, the distance greater than a product of the speed ratio by a radius of the track driving wheel thereby providing an anti-rotation feature to limit rotation of the track assemblies about the at least one of the two axles.

13. The motorized vehicle of claim 12, wherein the distance corresponds to at least 1.8 times the product of the speed ratio by the radius of the track driving wheel.

14. The motorized vehicle of claim 13, wherein the distance ranges from 2 to 5 times the product of the speed ratio by the radius of the track driving wheel.

15. The motorized vehicle of claim 12, further comprising wheels mounted on the axles of the vehicle, the vehicle further including at least two mounting plates secured to the wheels of the vehicle for rotating integrally therewith, the axle engaging device of each of the track assemblies in driving engagement with a respective one of the at least two mounting plates.

16. The motorized vehicle of claim 12, wherein each of the track assemblies includes a roller rotatably mounted to the frame and spaced apart from the axle engaging device along a radial distance relative to the axis of rotation of the axle engaging device, the roller configured for being in a rolling contact with a respective one of the track driving wheel and the other wheel, an axis of rotation of the roller intersecting the axis of rotation of the axle engaging device.

17. The motorized vehicle of claim 12, comprising a vehicle frame, the at least two track assemblies free from attachment to the vehicle frame.

18. A track kit for a motorized vehicle having wheels, the track kit comprising:
a mounting plate configured for being secured to one of the wheels of the motorized vehicle, the mounting plate defining a central aperture for receiving a fastener; and
a track assembly having a frame; an endless track engaged with a track wheel system, the track wheel system having a track driving wheel and at least one idler wheel being rotatably mounted to the frame about respective axles, the endless track in driving engagement with the track driving wheel; an axle engaging device rotatably mounted to the frame about a corresponding axle, the axle engaging device being securable to the mounting plate for integral rotation therewith, an axis of rotation of the axle engaging device spaced apart from a ground contacting area of the endless track by a distance taken along an axis perpendicular to the ground contacting area; and a mechanism drivingly engaging the axle engaging device to the track driving wheel, the mechanism transmitting a rotation of the axle engaging device to the track driving wheel, the mechanism defining a speed ratio defined as a rotational speed of the track driving wheel over a rotational speed of the axle engaging device, the distance greater than a product of the speed ratio by a radius of the track driving wheel thereby providing an anti-rotation feature to limit rotation of the track assembly about the axle.

19. The track kit of claim 18, wherein the distance corresponds to at least 1.8 times the product of the speed ratio by the radius of the track driving wheel.

20. The track kit of claim 18, wherein the mechanism includes a main driving wheel and a secondary driving wheel in driving engagement with the main driving wheel via a chain, the main driving wheel rotatable relative to the frame and disposed coaxially with the axle engaging device and rotating integrally therewith, the secondary driving wheel rotatable relative to the frame and disposed coaxially with the track driving wheel and rotating integrally therewith.

* * * * *